US008495502B2

(12) United States Patent
Boyle et al.

(10) Patent No.: US 8,495,502 B2
(45) Date of Patent: Jul. 23, 2013

(54) SYSTEM AND METHOD FOR INTERACTION BETWEEN USERS OF AN ONLINE COMMUNITY

(75) Inventors: Peter Currie Boyle, Burnaby (CA); Yu Zhang, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 12/333,698

(22) Filed: Dec. 12, 2008

(65) Prior Publication Data

US 2009/0164926 A1 Jun. 25, 2009

(30) Foreign Application Priority Data

Dec. 21, 2007 (CA) .................................... 2616234

(51) Int. Cl.
*G06F 3/00* (2006.01)
*G06F 3/048* (2006.01)
(52) U.S. Cl.
USPC ............ 715/751; 715/739; 715/760; 715/764
(58) Field of Classification Search
USPC .................................. 715/751, 760, 739, 764
See application file for complete search history.

(56) References Cited

U.S. PATENT DOCUMENTS

| 5,893,098 | A  | * | 4/1999  | Peters et al. .......................... 1/1 |
| 5,933,818 | A  |   | 8/1999  | Kasravi et al. |
| 6,199,067 | B1 |   | 3/2001  | Geller |
| 6,493,703 | B1 | * | 12/2002 | Knight et al. ......................... 1/1 |
| 6,515,681 | B1 | * | 2/2003  | Knight ........................... 715/751 |
| 6,912,521 | B2 | * | 6/2005  | Kraft et al. ............................ 1/1 |
| 7,080,082 | B2 |   | 7/2006  | Elder et al. |
| 7,120,864 | B2 | * | 10/2006 | Cai et al. ........................ 715/234 |
| 2002/0065802 | A1 | * | 5/2002  | Uchiyama ......................... 707/1 |
| 2002/0188777 | A1 | * | 12/2002 | Kraft et al. ..................... 710/100 |

(Continued)

FOREIGN PATENT DOCUMENTS

WO 2005103874 A3 11/2005

OTHER PUBLICATIONS

Sergio Bittanti et al, "Data-Mining of a Large Virtual Community: Relationships Between the Users DB and the Web-Log File", Proceedings of the 3rd SIAM International Conference on Data Mining, San Francisco, California, USA 2003.

(Continued)

*Primary Examiner* — Alvin H Tan
*Assistant Examiner* — Matthew Ell
(74) *Attorney, Agent, or Firm* — Schmeiser, Olsen & Watts, LLP; Matthew Chung (57) ABSTRACT

There is disclosed a method of facilitating interaction between users of an electronic community. In an embodiment, the method comprises: reviewing a user activity log for each user in the electronic community; executing a natural language parser to extract significant noun phrases from the user activity log; updating user profiles from the newly extracted noun phrases, based on their usage frequency and importance value; and storing the updated profiles in a user profile and relationship data base; and executing a similarity based clustering algorithm to cluster user profiles, thereby discovering relationships among users and storing them in a user profile and relationship database. The method may further comprise displaying for each user the one or more relationships to which the user is assigned, together with a list of users assigned to the one or more relationships. The method may also comprise storing for each user the relationship to which the user is assigned in a user profile and relationship database.

14 Claims, 6 Drawing Sheets

U.S. PATENT DOCUMENTS

| | | | |
|---|---|---|---|
| 2003/0105589 A1* | 6/2003 | Liu et al. | 702/1 |
| 2004/0128156 A1 | 7/2004 | Beringer et al. | |
| 2005/0154690 A1* | 7/2005 | Nitta et al. | 706/46 |
| 2005/0210024 A1 | 9/2005 | Hurst-Hiller et al. | |
| 2005/0216550 A1 | 9/2005 | Paseman et al. | |
| 2006/0136419 A1 | 6/2006 | Brydon et al. | |
| 2006/0155757 A1 | 7/2006 | Williams et al. | |
| 2006/0265258 A1 | 11/2006 | Powell et al. | |
| 2006/0282303 A1* | 12/2006 | Hale et al. | 705/10 |
| 2006/0282426 A1 | 12/2006 | Spears | |
| 2007/0011161 A1* | 1/2007 | Norton et al. | 707/6 |
| 2007/0121843 A1* | 5/2007 | Atazky et al. | 379/114.13 |
| 2008/0275899 A1* | 11/2008 | Baluja et al. | 707/102 |
| 2008/0294637 A1* | 11/2008 | Liu | 707/6 |

OTHER PUBLICATIONS

Guadong Xu, et al, "Towards User Profiling for Web Recommendation", Springer Verlag, 18th Australian Joint Conference on Artificial Intelligence, AI 2005: Advances in Artificial Intelligence, Dec. 5-9, 2005, pp. 415-424.

S. M. Bittanti, et al, "On the Relationships Between User Profiles and Navigation Sessions in Virtual Communities: A Data-mining Approach", IOS Press, Netherlands, Intelligent Data Analysis, V 8, N 6, 2004, pp. 579-600.

* cited by examiner

SYSTEM AND METHOD FOR INTERACTION BETWEEN USERS OF AN ONLINE COMMUNITY

FIELD OF THE INVENTION

The invention relates to a system and method for interaction between users, particularly users of an online community, such as a social network. More generally, the system and method automatically discovers potential relationships which may facilitate more interaction between users.

BACKGROUND OF THE INVENTION

Online communities, such as social networking sites, continue to grow in popularity as they allow participants to safely interact with other participants in a virtual environment. However, the potential for interaction between the various participants may not be readily apparent, and this may limit the actual interactions that take place between the participants. Some prior art solutions have attempted to define potential relationships between individuals. However, this has been based on limited analysis of user activity or self-identification through surveys, resulting in mapping of only simple connections between users.

SUMMARY OF THE INVENTION

The present invention relates to a system and method for interaction between users, particularly users of an online community, such as a social network. More generally, the system and method automatically discovers potential relationships which may facilitate more interaction between users. Automatically discovering the potential for increased interaction between users may have significant added value, both in terms of business opportunities for the site operator due to increased usage, and in terms of usefulness and effectiveness of the online social networking site for the users.

In an embodiment, a system and method in accordance with the present invention automatically generates user-interest profiles for each user of an online community, such as an online social network. The users are classified into different interest groups, and then the potential user relationships are displayed using various linking tools, such as hyperlinks in the case of web page interfaces, for example. The system and method may also gather information about whom and how individual users interact with other users and systems. Unlike conventional data gathering techniques, the system and method in accordance with an embodiment of the present invention clusters keywords in user log data in order to extrapolate and identify interconnections or relationships that may result in potential interactions between users.

In an aspect, there is provided a method of facilitating interaction between users of an electronic community, comprising: reviewing a user activity log for each user in the electronic community; executing a natural language parser to extract significant noun phrases from the user activity log; updating user profiles from the newly extracted noun phrases, based on their usage frequency and importance value; and storing the updated profiles in a user profile and relationship data base; and executing a similarity based clustering algorithm to cluster user profiles, thereby discovering relationships among users and storing them in a user profile and relationship database.

In an embodiment, the method further comprises displaying for each user the one or more relationships to which the user is assigned, together with a list of users assigned to the one or more relationships.

In another embodiment, the method further comprises storing for each user the one or more relationships to which the user is assigned in a user profile and relationship database.

In another embodiment, the method further comprises displaying the one or more relationships together with a list of users.

In another embodiment, the method further comprises providing a user interface for modifying the user profile in the user profile and relationship database, such that a user may manually add or remove the keywords and modify the weights of the keywords.

In another embodiment, the method further comprises: updating the user profiles from user activity logs at regular intervals; re-executing the similarity based clustering algorithm on the updated user profiles at regular intervals; displaying any newly assigned relationships to which the user is assigned, together with a list of users assigned to the newly assigned relationships; and removing any relationships to which the user is no longer assigned.

In another embodiment, the method further comprises providing a user interface for limiting the number of relationships displayed, and the number of users displayed for each relationship.

In another aspect, there is provided a system for facilitating interaction between users of an electronic community, comprising: means for reviewing a user activity log for each user in the electronic community; means for executing a natural language parser to extract significant noun phrases from the user activity log; means for updating user profiles from the newly extracted noun phrases, based on their usage frequency and importance value; and storing the updated profiles in a user profile and relationship data base; and means for executing a similarity based clustering algorithm to cluster user profiles, thereby discovering relationships among users and storing them in a user profile and relationship database.

In an embodiment, the system further comprises means for displaying for each user one or more relationships to which the user is assigned, together with a list of users assigned to the one or more relationships.

In another embodiment, the system further comprises means for storing for each user the one or more relationships to which the user is assigned in a user profile and relationship database.

In another embodiment, the system further comprises means for displaying the one or more relationships together with a list of users.

In another embodiment, the system further comprises means for providing a user interface for modifying the user profile in the user profile and relationship database, such that a user may manually add or remove the keywords and modify the weights of the keywords.

In another embodiment, the system further comprises: means for updating the user profiles from user activity logs at regular intervals; means for re-executing the similarity based clustering algorithm on the updated user profiles at regular intervals; a display for displaying any newly assigned relationships to which the user is assigned, together with a list of users assigned to the newly assigned relationships; and means for removing any relationships to which the user is no longer assigned.

In another embodiment, the system further comprises means for providing a user interface for limiting the number of relationships displayed, and the number of users displayed for each relationship.

In another aspect, there is provided a data processor readable medium storing data processor code that when loaded into a data processor device adapts the device to perform a method of facilitating interaction between users of an electronic community, comprising: code for reviewing a user activity log for each user in the electronic community; code for executing a natural language parser to extract significant noun phrases from the user activity log; code for updating user profiles from the newly extracted noun phrases, based on their usage frequency and importance value; and storing the updated profiles in a user profile and relationship data base; and code for executing a similarity based clustering algorithm to cluster user profiles, therefore discovering relationships among users and storing them in a user profile and relationship database.

In an embodiment, the data processor readable medium further comprises code for displaying for each user the one or more relationships to which the user is assigned, together with a list of users assigned to the one or more relationships.

In another embodiment, the data processor readable medium further comprises code for storing for each user the one or more relationships to which the user is assigned in a user profile and relationship database.

In another embodiment, the data processor readable medium further comprises code for displaying the one or more relationships together with a list of users.

In another embodiment, the data processor readable medium further comprises code for providing a user interface for modifying the user profile in the user profile and relationship database, such that a user may manually add or remove the keywords and modify the weights of the keywords.

In another embodiment, the data processor readable medium further comprises: code for updating the user profiles from user activity logs at regular intervals; code for re-executing the similarity based clustering algorithm on the updated user profiles at regular intervals; code for displaying any newly assigned relationships to which the user is assigned, together with a list of users assigned to the newly assigned relationships; and code for removing any relationships to which the user is no longer assigned.

These and other aspects of the invention will become apparent from the following more particular descriptions of exemplary embodiments.

BRIEF DESCRIPTION OF THE DRAWINGS

In the figures which illustrate exemplary embodiments of the invention.

DETAILED DESCRIPTION OF THE INVENTION

As noted above, the present invention relates to systems and methods for interactions between users of an online community, such as an online social network.

Figure 1:
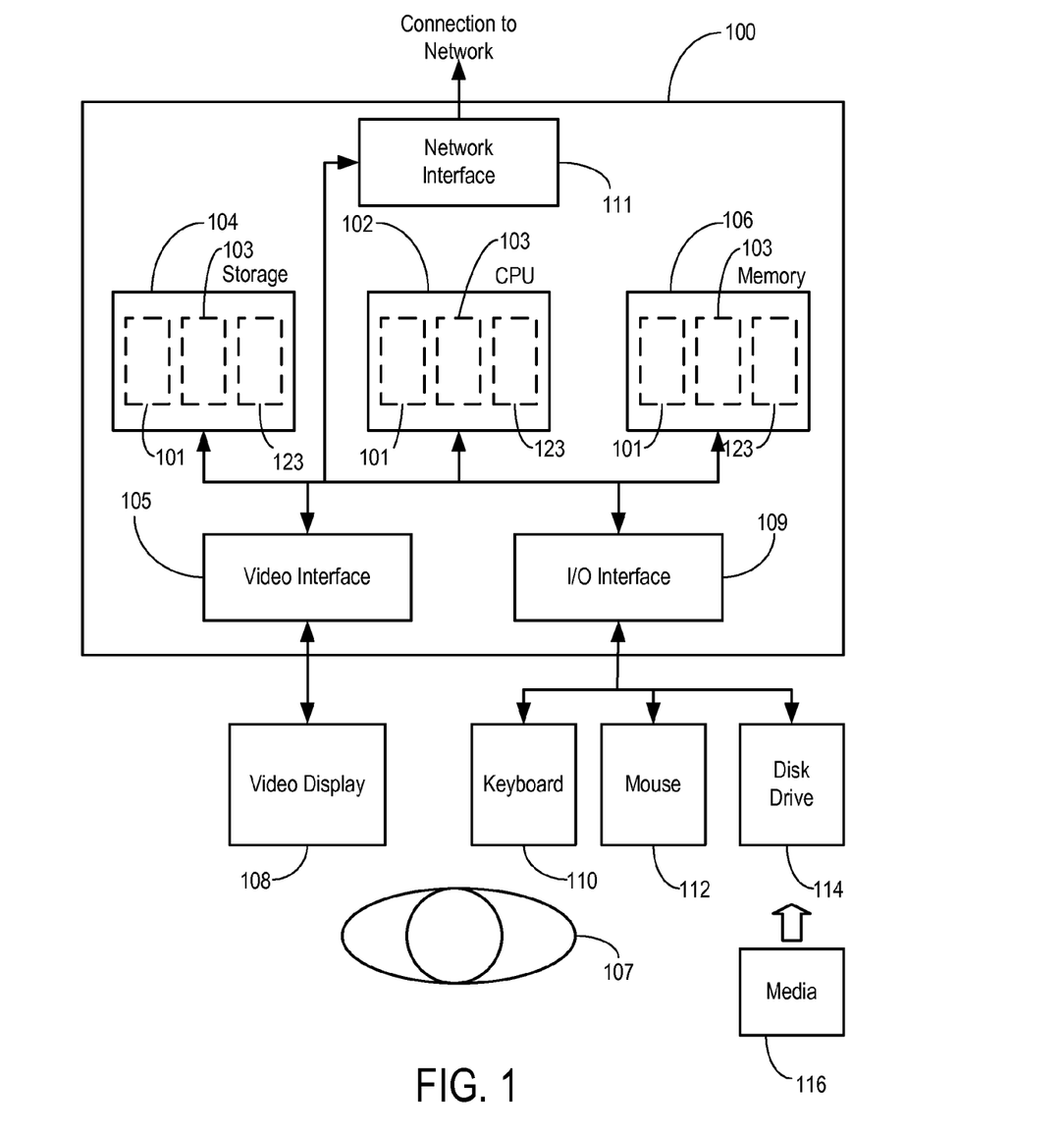
FIG. 1 shows a generic data processing system that may provide a suitable operating environment.

The invention may be practiced in various embodiments. A suitably configured data processing system, and associated communications networks, devices, software and firmware may provide a platform for enabling one or more embodiments. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface (GUI) controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown). The particular configurations shown by way of example in this specification are not meant to be limiting.

Figure 2:
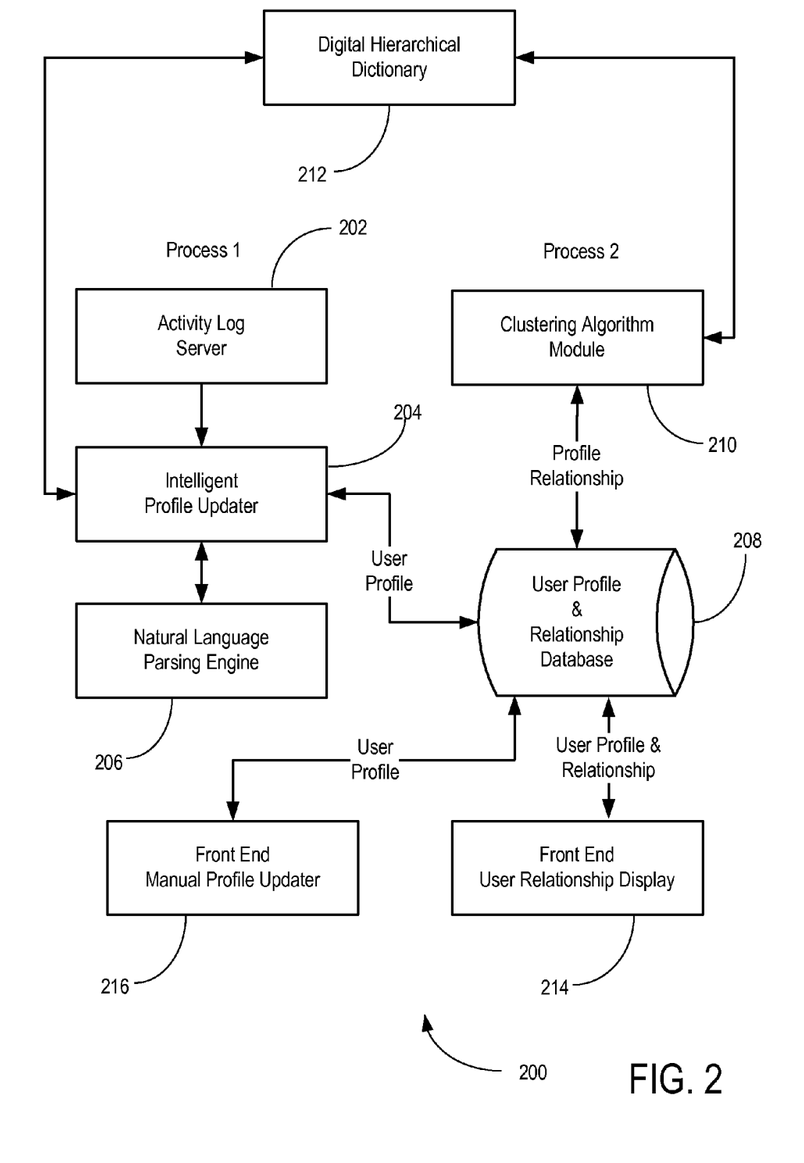
FIG. 2 shows a schematic block diagram of an illustrative system in accordance with an embodiment.

Now referring to FIG. 2, shown is an illustrative system 200 in accordance with an embodiment. As shown, system 200 may include an activity log server 202 which logs a user's interactions within the system 200, including the user's interaction with various system modules, and with other users of system 200. Many kinds of user activities (e.g. email, voicemail, voice conversations, instant messages, and electronically stored files, among others) can be logged, and converted into text format as necessary for the purposes of clustering noun phrases or keywords extracted from user log data, in order to extrapolate and identify potential interconnections or relationships.

The activity log server 202 may be operatively connected to an intelligent profile updater 204 which may be configured to update the user's profile based on recent user activity, as logged on activity log server 202. The intelligent profile updater 204 may also be configured to check the user activity logs periodically (e.g. daily, hourly, weekly), and to analyze the user activity logs with the help of a language parsing engine 206 and a digital hierarchical dictionary 212. A digital hierarchical dictionary, such as WORDNET®, groups noun phrases into sets of cognitive synonyms ("synsets"), each expressing a distinct concept. These synsets are then interlinked into a semantic hierarchical tree by means of conceptual-semantic and lexical relations. The intelligent profile updater 204 may further be operatively connected to a user profile and relationship database 208. The natural language parsing engine 206 may be used to calculate the meaningfulness of noun phrases or keywords, and to extract meaningful noun phrases or keywords for constructing a user profile. The constructed user profile may then be stored in the user profile and relationship database 208.

User profile and relationship database 208 may in turn be operatively connected to a clustering algorithm module 210 which may be used to cluster users into different and possibly overlapping context groups. The clustering algorithm module 210 may also be operatively connected to digital hierarchical dictionary 212 for calculating similarity distances between the noun phrases or keywords.

Still referring to FIG. 2, the user profile & relationship database 208 may be operatively connected to a front-end user relationship display 214 which may be adapted to display the relationship between users or user groups. For example, in a web based application interface, these relationships may be shown using hyperlinks. The relationships may also be displayed using various other means, such as graphical connectors linking two or more users. User profile and relationship database 208 may also be operatively connected to a front-end manual profile updater 216, which may be adapted to allow users to manually update their own profiles and override any potential relationship links calculated and assigned by the system 200.

As will be further explained below, in this system 200, the discovered relationships between users are not static. Rather, the relationships may continue to evolve as the users' interests change over time. New potential relationships may form between users and old relationships may disappear, as explained further below.

Figure 3:
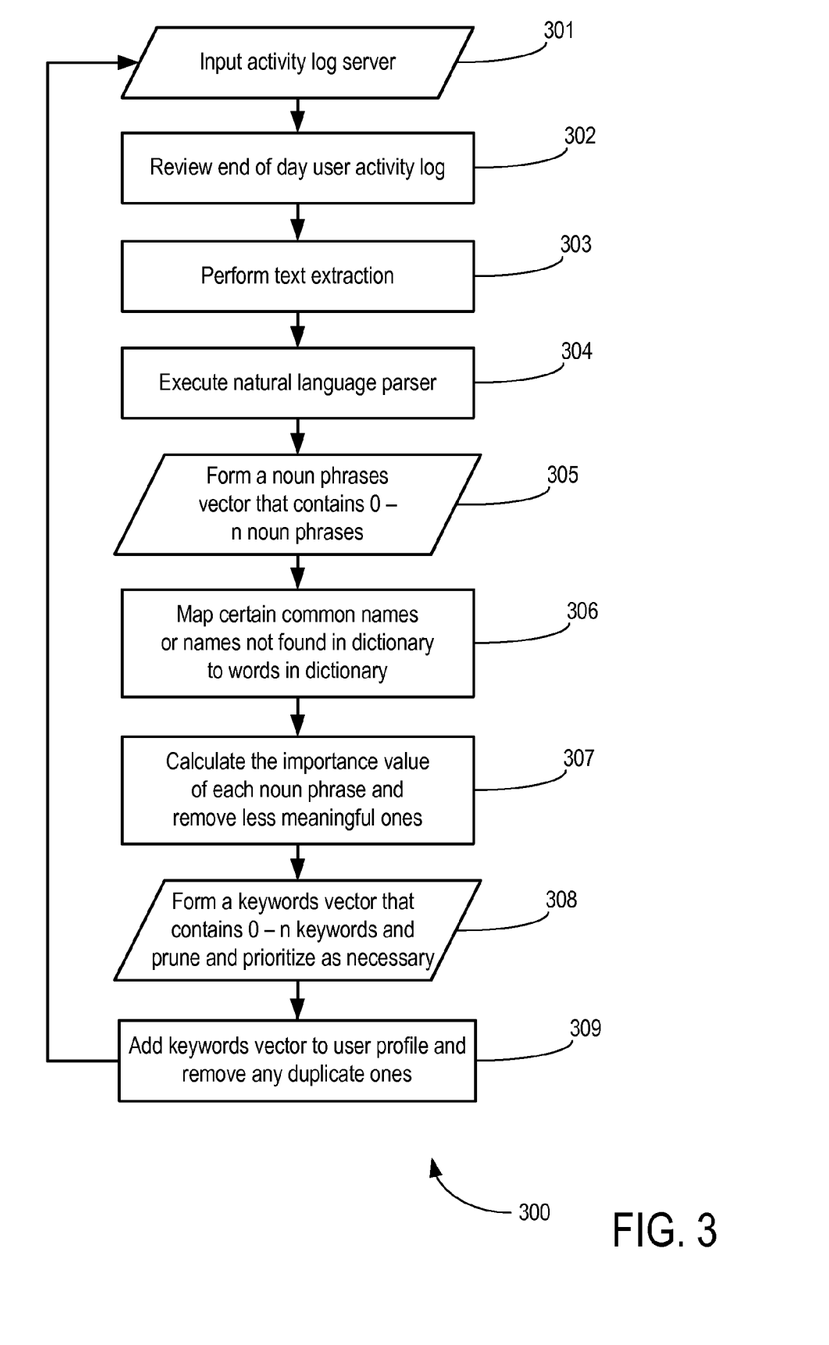
FIG. 3 shows an illustrative method in accordance with an embodiment.

Now referring to FIG. 3, shown is an illustrative method 300 in accordance with an embodiment. As shown, method 300 begins at block 301, where the user activities logged in the activity log server 202 are retrieved and input at block 301 for processing.

Next, method 300 proceeds to block 302, where method 300 may review each user's end of day user activity log. While a daily review of a user's activity log takes place in this illustrative example, it will be appreciated that various other time periods may also be used for the purposes of analysis, such as weekly, or hourly for example.

Method 300 may then proceed to block 303, where method 300 performs a text extraction from the user's activity logs. If the logged activity is not already in a text format (e.g. voicemail and recorded voice conversations), then the logged activity can be converted into suitable text format using various known speech-to-text conversion tools.

Method 300 may then proceed to block 304 where the text messages, which may have been translated into text from voice or other types of user activity logs, are parsed by a language parsing engine, such as natural language parsing engine 206 of FIG. 2. In an illustrative embodiment, the natural language processing engine used may be the General Architecture for Text Engineering (GATE) natural language engine.

Method 300 may then proceed to block 305, where method 300 may employ the natural language parsing engine 206 to form a noun phrases vector containing 0 to n number of noun phrases.

Method 300 may then proceed to block 306, where method 300 may map common names, or names not found in the digital hierarchical dictionary 212, to dictionary defined noun phrases. For example, if "George Bush" is not in the digital hierarchical dictionary 212, it may be mapped to a word or phrase in the digital hierarchical dictionary 212, such as "politics" or "American politics". The mapped word or phrase, for example, "American politics" may then be used for the keyword analysis. This mapping is provided by human and can be stored in a pure text file or in a database table before hand. It acts like an extension to the digital hierarchical dictionary. It is used in certain situations when the meaning of certain words and idioms are only known to certain audiences. In method 300, this file or table is searched for locating the similar phrase in the digital hierarchical dictionary.

Method 300 may then proceed to block 307, where method 300 may calculate the importance value of each new noun phrase or keyword, and remove the less meaningful ones. As an illustrative example, the importance value of each noun phrase or keyword may be decided by its depth in the semantic hierarchical tree of the online dictionary, WORDNET®. For example, in WORDNET, "bike" has a greater importance value than "vehicle" because bike is a specific type of vehicle, and is therefore more descriptive.

Figure 4:
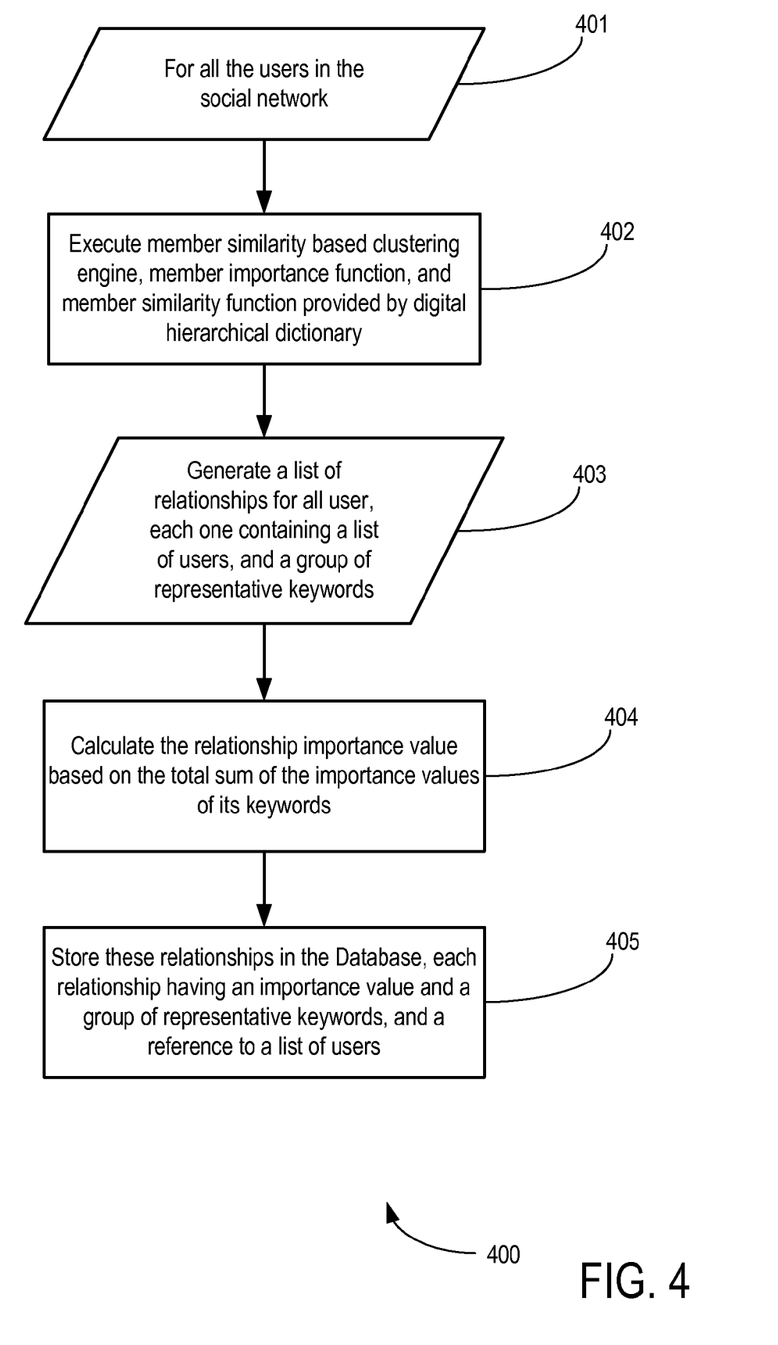
FIG. 4 shows another illustrative method in accordance with an embodiment.

Method 300 may then proceed to block 308, where the most important keywords left after block 307 form a keywords vector of 0 to n noun phrases. Method 300 may then proceed to block 309, where the new keywords vector is applied to update a user profile. All the keywords in a user profile are weighted by their usage frequency by the user and importance value. It could be a brand new keyword that is added to the user profile including the weight of importance value. Or if a keyword is already in the user profile, its weight may be increased by the importance value of the instance of the keyword. The user profile also maintains a feature list, which contains a list of most highly weighted keywords. This feature list is then used by the clustering algorithm for user relationship discovery in method 400 as described further below. The feature list evolves every time the user profile is updated. A more important keyword can be added to the feature list while a less important one is thrown out. This changing feature list affects the relationship discovery process. As described earlier, new potential relationships may form while old relationships may disappear. Method 300 may then loop back to block 301, and repeat as necessary.

Now referring to FIG. 4, shown is a method 400 for generating user-related processes in accordance with an embodiment. Method 400 starts at block 401 for all users. Method 400 then proceeds to block 402 where method 400 processes keywords using a member similarity based clustering algorithm module (e.g. clustering algorithm module 210). This clustering module classifies user profiles by using a member importance function and a member similarity function. In the present system, the member importance function is implemented as the depth in the semantic hierarchical tree of a dictionary. The member similarity function is then implemented as the path distance in the semantic hierarchical tree of a dictionary (e.g. digital hierarchical dictionary 212). The Clustering algorithm 402 allows the tuning of the clustering parameters for different effects. For example, we may adjust the similarity threshold to fine tune the number of clusters it returns. The bigger the similarity threshold, the less number of clusters (relationships); The smaller the similarity threshold, the more number of clusters (relationships).

Method 400 then proceeds to block 403, where method 400 generates a list of interconnections for all users, each one containing a list of users, and a group of representative keywords for that group.

Method 400 then proceeds to block 404, where method 400 calculates a relationship importance value based on the total sum of the importance values of its keywords that representing this relationship.

Method 400 then proceeds to block 405, where method 400 stores these relationships in the user profile and relationship database (e.g. user profile and relationship database 208). In the database, each relationship has an importance value and a group of representative keywords, as well as a reference to a list of users in that group. The importance value represents the relative significance of this. The group of representative keywords are the outcome of the clustering algorithm (like block 210). The keywords are usually closely related in meaning and when clustered together, they also define the type of the relationship. For example, a relationship is represented by "George Bush, American Politics". There could be active users on the topics of "George Bush, American Politics", and they are included in this relationship. The keyword clustering method as summarized above is also described in greater detail in co-pending U.S. patent application Ser. No. 11/366,517.

Figure 5:
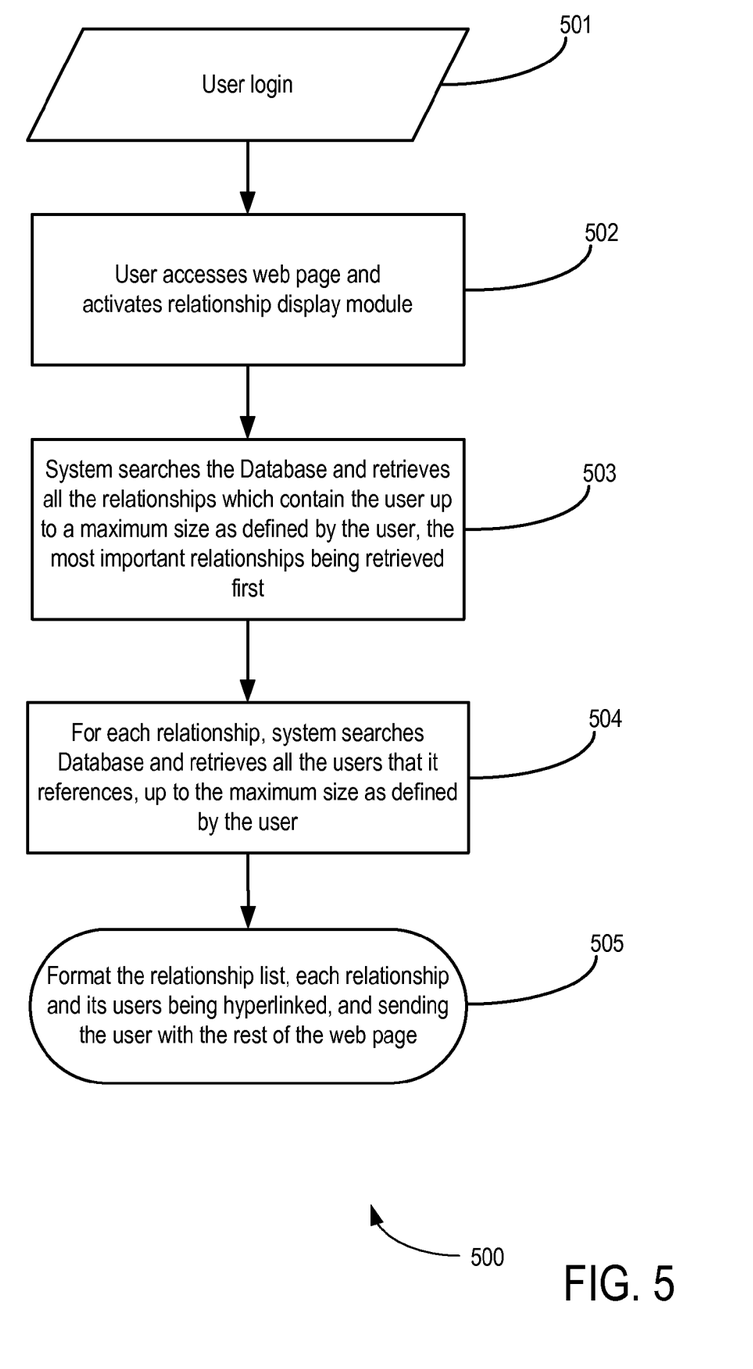
FIG. 5 shows another illustrative method in accordance with an embodiment.

Now referring to FIG. 5, shown is an illustrative example of a method 500 for displaying the user interconnections. This process is activated, for example, when a user logs in his/her application or web page. The backend process retrieves the relationship groups and users that are related to the current user, formats them, and displays them, for example as hyperlinks. The relationships shown can be filtered by the user's current log-on role and context. For example, the relationships shown when a user logs on at home are different from the relationships shown when a user logs on at work.

Method 500 begins at block 501 with a user login, and proceeds to block 502, where a relationship display module is activated upon user access of an application or webpage.

Method 500 then proceeds to block 503, where the user profile and relationship database is searched to retrieve all relationships which contain the user, up to a maximum size as defined by the user, the most important relationships being retrieved first.

Method 500 then proceeds to block 504, where for each relationship retrieved in block 503, the user profile and relationship database is searched for other users in that relationship, up to a maximum size as defined by the user.

Method 500 then proceeds to block 505, where the relationship list as retrieved in blocks 503 and 504 is formatted, with each relationship and its users being interconnected, for example by hyperlink in a web page interface.

Figure 6:
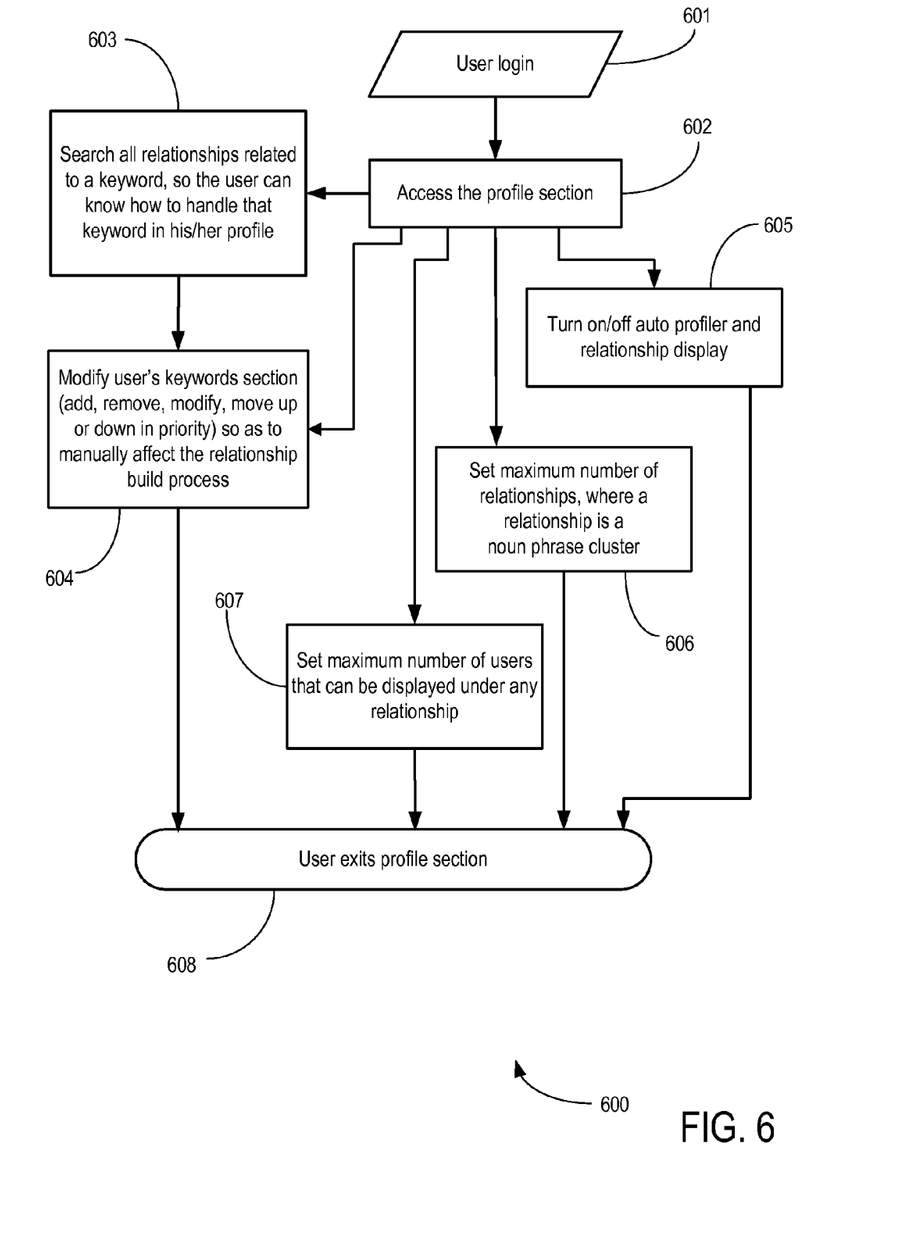
FIG. 6 shows yet another illustrative method in accordance with an embodiment.

Now referring to FIG. 6, shown is a method 600 for managing a user profile. Method 600 begins with a user login at block 601 and proceeds to block 602, where method 600 accesses the relationship profile section of the user. From block 602, method 600 may proceed to any one of blocks 603 to 607, where method 600 performs each of the following steps.

At block 603, method 600 searches all relationships related to a keyword, so that a user knows the connections of a keyword to known relationships and the effects it can bring to the relationship building process by adding/removing this keyword to/from his/her profile. Method 600 then proceeds to block 604, where method 600 modifies the user's keywords section (e.g. add, remove, modify, or move up or down in priority) so as to manually affect the relationship building process. Method 600 may also by-pass block 603 to go to block 604 directly. From block 604, method 600 proceeds to block 608, where the user exits his/her profile section.

At block 605, method 600 may allow the user to turn the auto profiler and relationship display on or off. Method 600 may then proceed to block 608 where the user exits.

At block 606, method 600 may allow the user to set the maximum number of relationships to which a user may be associated. Method 600 may then proceed to block 608 where the user may exit.

At block 607, method 600 may allow the user to set the maximum number of users that can be displayed under any relationship. Method 600 may then proceed to block 608, where the user may exit the profile section.

As will be appreciated, the user profile interface described above is meant to be interactive and configurable by the user to suit their needs. As well, the system in not static, but rather the user input can and will be used to influence the relationship group outcomes. For instance, the users can modify their own profiles so to manually affect the relationship generation process. For example, if the user has posted a message that has a word "rose" in it, but he doesn't want to be connected to people with a gardening interest, he/she can delete the keyword "rose" from his keyword profile. The profile can also be used to "discover" relationships in an area where the user has no electronic history based on the user's activity log. For instance if he has not had any electronic activities relating to "rose gardening", but he wants to be connected to people with that interest, he can also manually add keywords to his keyword profile, which would cause the system to evaluate again, looking for new potential relationships. As well, the user can move the keywords to emphasis or de-emphasis an area. For example, if a user has lost interesting in rose gardening, the user may move those keywords down the priority list by reducing its weight.

The user can also limit the number of users that can be displayed under any discovered relationship. This can be done, for example, by displaying only the top five users and/or relationships. Similarly if the user is searching for more obscure topics, the user can specify relationships that fall in the range of the lower than 10 and higher than 25.

By managing the keywords, the users can expose, hide, and filter what information they or others see. In an embodiment, the user can also type in a keyword, and the system will present the keywords/clusters related to that keyword. This permits the ability to search a user's relationship map. For example, the keywords "pruning roses" may be typed in the system to show potential relationships and related keywords. In this manner, the user knows how she/he should handle that keyword in her/his profile.

While various illustrative embodiments of the invention have been described above, it will be appreciated by those skilled in the art that variations and modifications may be made. Thus, the scope of the invention is defined by the following claims.

What is claimed is:

1. A method of facilitating interaction between users of an electronic community, comprising:

reviewing a user activity log for each user in the electronic community, each user having an associated user profile stored in a user profile and relationship database;

executing a natural language parser to extract noun phrases from the each user activity log;

updating the user profiles from the extracted noun phrases, a keyword being associated with each extracted noun phrase, said updating based on a usage frequency of the extracted noun phrases and an importance value of the keywords;

storing the updated user profiles in the user profile and relationship database;

executing a similarity based clustering algorithm to generate clusters of the updated user profiles, each cluster consisting of a group of users of the users in the electronic community, each cluster representing a relationship between the users in each group; and storing each cluster in the user profile and relationship database, wherein a digital hierarchical dictionary comprises synsets, each synset being a set of cognitive synonyms consisting of noun phrases, said synsets being interlinked into a semantic hierarchical tree within the digital hierarchical dictionary, wherein the keyword associated with each extracted noun phrase is in a synset within the semantic hierarchical tree, wherein the similarity based clustering algorithm comprises a member importance function and a member similarity function, wherein the member importance function ascertains an importance value of keywords as a depth of said keywords in the semantic hierarchical tree, wherein the member similarity function ascertains a similarity distance between keywords as a path distance between said keywords in the semantic hierarchical tree, and wherein said executing the similarity based clustering algorithm comprises: using the member importance function and the member similarity function to ascertain the clusters.

2. The method of claim 1, wherein the method further comprises calculating a relationship importance value of the relationship represented by a first cluster of the clusters of users by:
using the member importance function to ascertain importance values of the keywords of the first cluster; and
calculate the importance value of the relationship represented by the first cluster as a sum of the ascertained importance values of the keywords of the first cluster.

3. The method of claim 1, wherein the similarity based clustering algorithm uses a similarity threshold to constrain a total number of clusters returned from said executing the similarity based clustering algorithm, and wherein said executing the similarity based clustering algorithm comprises:
increasing the similarity threshold to decrease the total number of clusters returned from said executing the similarity based clustering algorithm; or
decreasing the similarity threshold to increase the total number of clusters returned from said executing the similarity based clustering algorithm.

4. The method of claim 1, wherein said updating comprises:
using the member importance function to ascertain a first importance value as a first depth in the semantic hierarchical tree of a first keyword associated with a first noun phrase of the extracted noun phrases;
ascertaining, via use of the member importance function, a second importance value as a second depth in the semantic hierarchical tree of a second keyword whose depth in the semantic hierarchical tree exceeds the first depth and whose meaning is more specific and descriptive than is the meaning of the first keyword; and
in response to ascertaining that the second depth exceeds the first depth, replacing the first noun phrase in a first user profile of the user profiles by a second noun phrase to which the second keyword is associated.

5. The method of claim 1, wherein a first noun phrase of the extracted noun phrases is a first name not found in the digital hierarchical dictionary, and wherein a dataset consisting of a text file or a database table comprises mappings of names to respective noun phrases, wherein the mappings comprise a first mapping of the first name to a respective second noun phrase, and wherein the method further comprises:
ascertaining the second noun phrase from the first mapping.

6. A data processing system comprising a processor, a memory coupled to the processor, and a computer readable storage device coupled to the processor, said storage device containing program code configured to be executed by the processor via the memory to implement a method of facilitating interaction between users of an electronic community, said method comprising:
reviewing a user activity log for each user in the electronic community, each user having an associated user profile stored in a user profile and relationship database;
executing a natural language parser to extract noun phrases from the user activity log;
updating the user profiles from the extracted noun phrases, a keyword being associated with each extracted noun phrase, said updating based on a usage frequency of the extracted noun phrases and an importance value of the keywords;
storing the updated user profiles in the user profile and relationship database;
executing a similarity based clustering algorithm to generate clusters of the updated user profiles, each cluster consisting of a group of users of the users in the electronic community, each cluster representing a relationship between the users in each group; and
storing each cluster in the user profile and relationship database,
wherein a digital hierarchical dictionary comprises synsets, each synset being a set of cognitive synonyms consisting of noun phrases, said synsets being interlinked into a semantic hierarchical tree within the digital hierarchical dictionary,
wherein the keyword associated with each extracted noun phrase is in a synset within the semantic hierarchical tree,
wherein the similarity based clustering algorithm comprises a member importance function and a member similarity function,
wherein the member importance function ascertains an importance value of keywords as a depth of said keywords in the semantic hierarchical tree,
wherein the member similarity function ascertains a similarity distance between keywords as a path distance between said keywords in the semantic hierarchical tree, and
wherein said executing the similarity based clustering algorithm comprises: using the member importance function and the member similarity function to ascertain the clusters.

7. The system of claim 6, wherein the method further comprises calculating a relationship importance value of the relationship represented by a first cluster of the clusters of users by:
using the member importance function to ascertain importance values of the keywords of the first cluster; and
calculate the importance value of the relationship represented by the first cluster as a sum of the ascertained importance values of the keywords of the first cluster.

8. The system of claim 6, wherein the similarity based clustering algorithm uses a similarity threshold to constrain a total number of clusters returned from said executing the similarity based clustering algorithm, and wherein said executing the similarity based clustering algorithm comprises:
increasing the similarity threshold to decrease the total number of clusters returned from said executing the similarity based clustering algorithm; or
decreasing the similarity threshold to increase the total number of clusters returned from said executing the similarity based clustering algorithm.

9. The system of claim 6, wherein said updating comprises:
using the member importance function to ascertain a first importance value as a first depth in the semantic hierarchical tree of a first keyword associated with a first noun phrase of the extracted noun phrases;
ascertaining, via use of the member importance function, a second importance value as a second depth in the semantic hierarchical tree of a second keyword whose depth in the semantic hierarchical tree exceeds the first depth and whose meaning is more specific and descriptive than is the meaning of the first keyword; and
in response to ascertaining that the second depth exceeds the first depth, replacing the first noun phrase in a first user profile of the user profiles by a second noun phrase to which the second keyword is associated.

10. The system of claim 6, wherein a first noun phrase of the extracted noun phrases is a first name not found in the digital hierarchical dictionary, and wherein a dataset consisting of a text file or a database table comprises mappings of names to respective noun phrases, wherein the mappings comprise a first mapping of the first name to a respective second noun phrase, and wherein the method further comprises:

ascertaining the second noun phrase from the first mapping.

11. A data processor readable medium, said medium comprising program code stored therein, said medium not being a transitory signal, said program code configured to be executed by a processor of a data processing system to perform a method of facilitating interaction between users of an electronic community, said method comprising:

reviewing a user activity log for each user in the electronic community, each user having an associated user profile stored in a user profile and relationship database;

executing a natural language parser to extract noun phrases from the user activity log;

updating the user profiles from the extracted noun phrases, a keyword being associated with each extracted noun phrase, said updating based on a usage frequency of the extracted noun phrases and an importance value of the keywords;

storing the updated user profiles in the user profile and relationship database;

executing a similarity based clustering algorithm to generate clusters of the updated user profiles, each cluster consisting of a group of users of the users in the electronic community, each cluster representing a relationship between the users in each group; and storing each cluster in the user profile and relationship database, wherein a digital hierarchical dictionary comprises synsets, each synset being a set of cognitive synonyms consisting of noun phrases, said synsets being interlinked into a semantic hierarchical tree within the digital hierarchical dictionary, wherein the keyword associated with each extracted noun phrase is in a synset within the semantic hierarchical tree, wherein the similarity based clustering algorithm comprises a member importance function and a member similarity function, wherein the member importance function ascertains an importance value of keywords as a depth of said keywords in the semantic hierarchical tree, wherein the member similarity function ascertains a similarity distance between keywords as a path distance between said keywords in the semantic hierarchical tree, and wherein said executing the similarity based clustering algorithm comprises: using the member importance function and the member similarity function to ascertain the clusters.

12. The medium of claim 11, wherein the method further comprises calculating a relationship importance value of the relationship represented by a first cluster of the clusters of users by:

using the member importance function to ascertain importance values of the keywords of the first cluster; and calculate the importance value of the relationship represented by the first cluster as a sum of the ascertained importance values of the keywords of the first cluster.

13. The medium of claim 11, wherein the similarity based clustering algorithm uses a similarity threshold to constrain a total number of clusters returned from said executing the similarity based clustering algorithm, and wherein said executing the similarity based clustering algorithm comprises:

increasing the similarity threshold to decrease the total number of clusters returned from said executing the similarity based clustering algorithm; or decreasing the similarity threshold to increase the total number of clusters returned from said executing the similarity based clustering algorithm.

14. The medium of claim 11, wherein said updating comprises:

using the member importance function to ascertain a first importance value as a first depth in the semantic hierarchical tree of a first keyword associated with a first noun phrase of the extracted noun phrases;

ascertaining, via use of the member importance function, a second importance value as a second depth in the semantic hierarchical tree of a second keyword whose depth in the semantic hierarchical tree exceeds the first depth and whose meaning is more specific and descriptive than is the meaning of the first keyword; and in response to ascertaining that the second depth exceeds the first depth, replacing the first noun phrase in a first user profile of the user profiles by a second noun phrase to which the second keyword is associated.

* * * * *